United States Patent
Kita et al.

(10) Patent No.: US 9,702,587 B2
(45) Date of Patent: Jul. 11, 2017

(54) WATER STORAGE VESSEL ASSEMBLY WITH COIL SUPPORT MEMBER

(75) Inventors: Yuuichi Kita, Kusatsu (JP); Teruo Nishida, Kusatsu (JP); Mathieu Ghesquiere, Ostend (BE)

(73) Assignees: Daikin Industries, Ltd., Osaka (JP); Daikin Europe N.V., Ostend (BE)

( * ) Notice: Subject to any disclaimer, the term of this patent is extended or adjusted under 35 U.S.C. 154(b) by 515 days.

(21) Appl. No.: 13/581,265

(22) PCT Filed: Feb. 26, 2010

(86) PCT No.: PCT/JP2010/001342
§ 371 (c)(1),
(2), (4) Date: Aug. 24, 2012

(87) PCT Pub. No.: WO2011/104766
PCT Pub. Date: Sep. 1, 2011

(65) Prior Publication Data
US 2012/0312253 A1 Dec. 13, 2012

(51) Int. Cl.
*F28F 9/013* (2006.01)
*F24H 1/20* (2006.01)
(Continued)

(52) U.S. Cl.
CPC .......... *F24H 1/208* (2013.01); *F24H 9/1809* (2013.01); *F28D 1/0472* (2013.01);
(Continued)

(58) Field of Classification Search
CPC .......... F24H 9/18; F24H 9/1809; F28F 9/013
(Continued)

(56) References Cited

U.S. PATENT DOCUMENTS 3,768,526 A * 10/1973 Sanz .................... G01N 35/026
141/125
4,492,851 A * 1/1985 Carr ............................ 219/201
(Continued)

FOREIGN PATENT DOCUMENTS

DE        246 159 A1    5/1987
DE    203 14 766 U1    1/2004
(Continued)

OTHER PUBLICATIONS

International Preliminary Report of corresponding PCT Application No. PCT/JP2010/001342.
(Continued)

*Primary Examiner* — Alissa Tompkins
*Assistant Examiner* — John Bargero
(74) *Attorney, Agent, or Firm* — Global IP Counselors, LLP

(57) ABSTRACT

A coil support member is attached to a coil inside a water storage vessel and includes multiple openings, insertion portions and a non-insertion portion. The openings are arranged in a lengthwise direction, and together with surrounding sites prevent contact between mutually adjacent loops of the tube of the coil and suppress contact between an inner surface of the water storage vessel and an outer surface of the coil. The insertion portions are formed between the openings and are inserted into an intra-coil space located radially inward of the outer surface of the coil. The non-insertion portion is positioned in an extra-coil space located radially outward of the outer surface of the coil. The insertion portions have insertion body portions preventing contact between mutually adjacent loops of the tube, and engagement portions contacting the tube from the intra-coil space and maintaining an inserted state of the insertion body portions.

7 Claims, 10 Drawing Sheets

(51) Int. Cl.
*F24H 9/18* (2006.01)
*F28D 1/047* (2006.01)
*F28D 20/00* (2006.01)

(52) U.S. Cl.
CPC ........ *F28D 20/0034* (2013.01); *F28F 9/0131* (2013.01); *F28D 2020/0078* (2013.01); *Y02E 60/142* (2013.01)

(58) Field of Classification Search
USPC .................................................. 122/32, 510
See application file for complete search history.

(56) References Cited

U.S. PATENT DOCUMENTS

D316,038 S * 4/1991 Gagnet .......................... D9/435
5,447,191 A * 9/1995 Boula ................... F22B 37/206
122/510

FOREIGN PATENT DOCUMENTS

| DE | 20 2006 004 396 U1 | 6/2007 |
|----|---|---|
| EP | 0 676 592 A2 | 10/1995 |
| EP | 1 703 227 A2 | 9/2006 |
| EP | 1 983 287 A1 | 10/2008 |
| JP | 2006-521528 A | 9/2006 |

OTHER PUBLICATIONS

International Search Report of corresponding PCT Application No. PCT/JP2010/001342.
Extended European Search Report of corresponding EP Application No. 10 78 4939.0 dated Dec. 7, 2011.

* cited by examiner

WATER STORAGE VESSEL ASSEMBLY WITH COIL SUPPORT MEMBER

TECHNICAL FIELD

The present invention relates to a coil support member for a coil configured by a coiled tube placed in a water storage vessel.

BACKGROUND ART

In recent years, in the water heater market, water heaters that heat water inside a watt storage vessel by causing water that has been heated by a heat pump to circulate in a coil configured by a coiled tube placed inside the water storage vessel have come into widespread use.

In these water heaters, it is necessary to maintain the clearances between mutually adjacent loops of the tube of the coil at a constant to stabilize heat exchange performance; for example, in the water heater disclosed in EP 1,983,287 A1, a coil support member is inserted into clearances between mutually adjacent loops of the tube of the coil, and a fixing member that fixes the coil support member is inserted into a clearance between the coil support member and the tube. The coil support member does not become disengaged from the clearances between the mutually adjacent loops of the tube as long as the fixing member does not come off, and the clearances between the mutually adjacent loops of the tube are stable.

SUMMARY

Technical Problem

However, when the fixing member is inserted into the clearance between the coil support member and the tube, the distal end of the fixing member moves through the clearance while hitting the tube and the coil support member, so the work of insertion is not easy.

It is a problem of the present invention to provide a coil support member that is equipped with a disengagement prevention function and whose insertion into the clearances between the mutually adjacent loops of the tube is easy.

Solution to the Problem

A coil support member pertaining to a first aspect of the present invention is a coil support member that is attached to a coil configured by a coiled tube placed inside a water storage vessel and which, because of multiple openings firmed so as to be arranged in a line in a lengthwise direction and sites surrounding the openings, prevents contact between mutually adjacent loops of the tube of the coil and suppresses contact between an inner peripheral surface of the water storage vessel and an outer peripheral surface of the coil, the coil support member comprising insertion portions and a non-insertion portion. The insertion portions are formed between the openings that are mutually adjacent, and the insertion portions are inserted into an intra-coil space located further inward in a radial direction than the outer peripheral surface of the coil when the coil support member is attached to the coil. The non-insertion portion is positioned in an extra-coil space located further outward in the radial direction than the outer peripheral surface of the coil when the coil support member is attached to the coil. Further, the insertion portions have insertion body portions and engagement portions, The insertion body portions prevent contact between mutually adjacent loops of the tube. The engagement portions project from the insertion body portions, contact the tube from the intra-coil space, and maintain the inserted state of the insertion body portions.

In this coil support member, when the insertion body portions enter the clearances between the mutually adjacent loops of the tube, the engagement portions contact the tube, move through the clearances while bending, and eventually confront the tube from the intra-coil space. Even if the coil support member tries to move in a direction away from the tube, the engagement portions deter the movement of the coil support member, so the coil support member is prevented from becoming disengaged from the tube.

A coil support member pertaining to a second aspect of the present invention is the coil support member pertaining to the first aspect, wherein distal end portions of the engagement portions and joint portions between the engagement portions and the insertion body portions are shaped in arc shapes.

In this coil support member, the distal end portions of the engagement portions have arc shapes, so it becomes easier for the distal end portions of the engagement portions and the surface of the tube to slide against each other, and it becomes easier for the insertion body portions to enter the clearances between the mutually adjacent loops of the tube. Further, when the engagement portions bend, stress concentrates in the joint portions, but because the joint portions are shaped in arc shapes, the stress is suppressed from concentrating in one point and damage to the joint portions is prevented.

A coil support member pertaining to a third aspect of the present invention is the coil support member pertaining to the first aspect, wherein the engagement portions include first engagement portions that project from one of the insertion body portions towards one side of the openings that are adjacent to both sides of that one insertion body portion and second engagement portions that project towards the other side.

The insertion body portions twist as a result of the sides having the engagement portions being pressed by the tube, and it becomes easier for the coil support member to become disengaged from the tube because the engagement portions slant when the insertion body portions have been twisted in one direction. However, in this coil support member, twisting in one direction is prevented because there is one more engagement portion on the opposite side, so it becomes difficult for the coil support member to become disengaged from the tube.

A coil support member pertaining to a fourth aspect of the present invention is the coil support member pertaining to the third aspect, wherein the first engagement portions and the second engagement portions are positioned a predetermined distance apart from each other in a direction orthogonal to the direction in which the openings are arranged in a line.

When the first engagement portions and the second engagement portions are arranged on a single line, the two sets of engagement portions bend at the same time when the insertion portions are inserted into the coil, so the insertion force becomes larger. However, in this coil support member, the first engagement portions and the second engagement portions are positioned the predetermined distance apart from each other, so it becomes possible to insert the insertion portions such that one set of the engagement portions bends first and the other set of the engagement portions bends later. As a result, the peak of the insertion force can be lowered, and, correspondingly, insertion becomes easier.

A coil support member pertaining to a fifth aspect of the present invention is the coil support member pertaining to the first aspect, wherein the non-insertion portion, the insertion body portions, and the engagement portions are integrally molded.

In this coil support member, the number of parts is reduced, and the coil support member can be manufactured by any of the methods of milling, punch molding, and injection molding, on a reasonable manufacturing method can be selected depending on the production quantity.

A coil support member pertaining to a sixth aspect of the present invention is the coil support member pertaining to the fifth aspect, wherein the coil support member is molded out of high-density polyethylene.

In this coil support member, it is difficult for the coil support member to damage the tube because high-density polyethylene resin is lightweight and has a moderate degree of elasticity. Further, high-density polyethylene has no adverse effects with respect to drinking water and food, is also resistant to high-temperature water for hot-water supply, and is suited to prolonged immersion in water.

A water storage vessel assembly pertaining to a seventh aspect of the present invention comprises the coil support member pertaining to any one of the first aspect to the sixth aspect, the coil, and the water storage vessel.

In this water storage vessel assembly, when the insertion body portions of the coil support member enter the clearances between the mutually adjacent loops of the tube, the engagement portions contact the tube, move through the clearances while bending, and eventually confront the tube from the intra-coil space. Even if the coil support member tries to move in a direction away from the tube, the engagement portions deter the movement of the coil support member, so the coil support member is prevented from becoming disengaged from the tube.

A water storage vessel assembly pertaining to an eighth aspect of the present invention is the water storage vessel assembly pertaining to the seventh aspect, wherein in non-insertion portion of the coil support member, first slanted portions and second slanted portions are formed. The first slanted portions slant in a direction in which the width of the non-insertion portion becomes narrower nearer a lengthwise direction end surface. The second slanted portions slant in the direction in which the width of the non-insertion portion becomes narrower from positions nearer the end surface than the first slanted portions to the end surface.

In this water storage vessel assembly, when the coil is incorporated into the water storage vessel, the end portion of the coil support member attached to the coil is forcibly bent along the circumferential surface of the water storage vessel, so there is the potential for the end portion of the coil support member to be shaved by the opening edge of the water storage vessel.

Thus, by allowing the non-insertion portion of the coil support member to slant towards the end surface such that the width of the non-insertion portion becomes narrower, at the initial stage of incorporation, the bending amount becomes smaller and shaving is suppressed. Further, after the coil support member has been incorporated a certain extent, the portion that has not yet been incorporated also bends by itself after the bending of the portion that has been incorporated first, so incorporation becomes easier.

Further, usually the bottom portion of a vessel has a "bowl-like shape" where its diameter becomes smaller towards its center, but because the width of the end portion of the non-insertion portion is tapered because of the second slanted portions, bending of the kind where stress concentrates on one side of the end portion is suppressed, and the coil support member can withstand prolonged use.

A water storage vessel assembly pertaining to a ninth aspect of the present invention is the water storage vessel assembly pertaining to the seventh aspect or the eighth aspect, wherein a force P1 needed for applying, to free ends of the non-insertion portion, bending equivalent to a dimensional difference S-R between an inner peripheral surface radius R of the water storage vessel and a hypothetical shortest dimension S of the coil is less than 100 N. Here, the hypothetical shortest dimension S is a dimension interconnecting in a shortest manner the central axis of the coil and the width direction free ends of the non-insertion portion of the coil support member as attached to that coil.

In this water storage vessel assembly, when a worker incorporates the coil into the water storage vessel, the work of incorporating the coil while bending the coil support member becomes easier.

A water storage vessel assembly pertaining to a tenth aspect of the present invention is the water storage vessel assembly pertaining to any one of the seventh aspect to the ninth aspect, wherein the clearance between the inner peripheral surface of the water storage vessel and the outer peripheral surface of the coil, the height dimension of the coil, the positions of the engagement portions, the material of the non-insertion portion, and the thickness dimension of the non-insertion portion are selected on the condition that the relational expression of P<N×D always holds true between a total number N of the engagement portions of the coil support member, an engagement portion pressing force D, and a non-insertion portion pressing force P. Here, the engagement portion pressing force D is a pressing force needed to bend one of the engagement portions when the insertion portions of the coil support member are to be inserted into the coil. Further, the non-insertion portion pressing force P is a pressing force needed for holding until width direction free ends of the non-insertion portion of the coil support member hit the outer peripheral surface of the coil.

In this water storage vessel assembly, it is estimated that when the assembly has been shaken to the point where the outer peripheral surface of the coil comes closest to the inner peripheral surface of the water storage vessel, the width direction free ends of the non-insertion portion will be pressed until they hit the outer peripheral surface of the coil. At this time, even when the force acting on the non-insertion portion acts on all of the engagement portions as a reaction force, the force required to bend the engagement portions is larger, so the coil support member is prevented from becoming disengaged from the tube.

Advantageous Effects of the Invention

In the coil support member pertaining to the first aspect of the invention, even if the coil support member tries to move in a direction away from the tube, the engagement portions deter the movement of the coil support member, so the coil support member is prevented from becoming disengaged from the tube.

In the coil support member pertaining to the second aspect of the present invention, it becomes easier for the distal end portions of the engagement portions and the surface of the tube to slide against each other, and it becomes easier for the insertion body portions to enter the clearances between the mutually adjacent loops of the tube, Further, because the joint portions are shaped in arc shapes, stress is suppressed from concentrating in one point and damage to the joint portions is prevented.

In the coil support member pertaining to the third aspect of the present invention, twisting of the insertion body portions in one direction is prevented, so it becomes difficult for the coil support member to become disengaged from the tube.

In the coil support member pertaining to the fourth aspect of the present invention, first engagement portions and the second engagement portions are positioned the predetermined distance apart from each other, so it becomes possible to insert the insertion portions such that one set of the engagement portions bends first and the other set of the engagement portions bends later, the peak of the insertion force can be lowered, and, correspondingly, insertion becomes easier.

In the coil support member pertaining to the fifth aspect of the present invention, the number of parts is reduced, and the coil support member can be manufactured by any of the methods of milling, punch molding, and injection molding, so a reasonable manufacturing method can be selected depending on the production quantity.

In the coil support member pertaining to the sixth aspect of the present invention, it is difficult for the coil support member to damage the tube because high-density polyethylene resin is lightweight and has a moderate degree of elasticity Further, high-density polyethylene resin has no adverse effects with respect to drinking water and food, is also resistant to high-temperature water for hot-water supply; and is suited to prolonged immersion in water.

In the water storage vessel assembly pertaining to the seventh aspect of the present invention, even if the coil support member tries to move in a direction away from the tube, the engagement portions deter the movement of the coil support member, so the coil support member is prevented from becoming disengaged from the tube.

In the water storage vessel assembly pertaining to the eighth aspect of the present invention, at the initial stage of incorporation, the bending amount becomes smaller, so shaving is suppressed. Further, the portion that has not yet been incorporated bends by itself after the bending of the portion that has been incorporated first, so incorporation becomes easier. Further, because the width of the end portion of the non-insertion portion is tapered, bending of the kind where stress concentrates on one side of the end portion is suppressed, and the coil support member can withstand prolonged use.

In the water storage vessel assembly pertaining to the ninth aspect of the present invention, the work of the worker incorporating the coil into the water storage vessel while bending the coil support member becomes easier.

In the water storage vessel assembly pertaining to the tenth aspect of the present invention, when the assembly has been shaken to the point where the outer peripheral surface of the coil comes closest to the inner peripheral surface of the water storage vessel, even when the force acting on the non-insertion portion acts on all of the engagement portions as a reaction force, the force required to bend the engagement portions is larger, so the coil support member is prevented from becoming disengaged from the tube.

DESCRIPTION OF THE EMBODIMENT

One embodiment of the present invention will be described below with reference to the drawings. The embodiment below is a specific example of the present invention and is not intended to limit the technical scope of the present invention.

<Water Storage Vessel Assembly 3>

Figure 1:
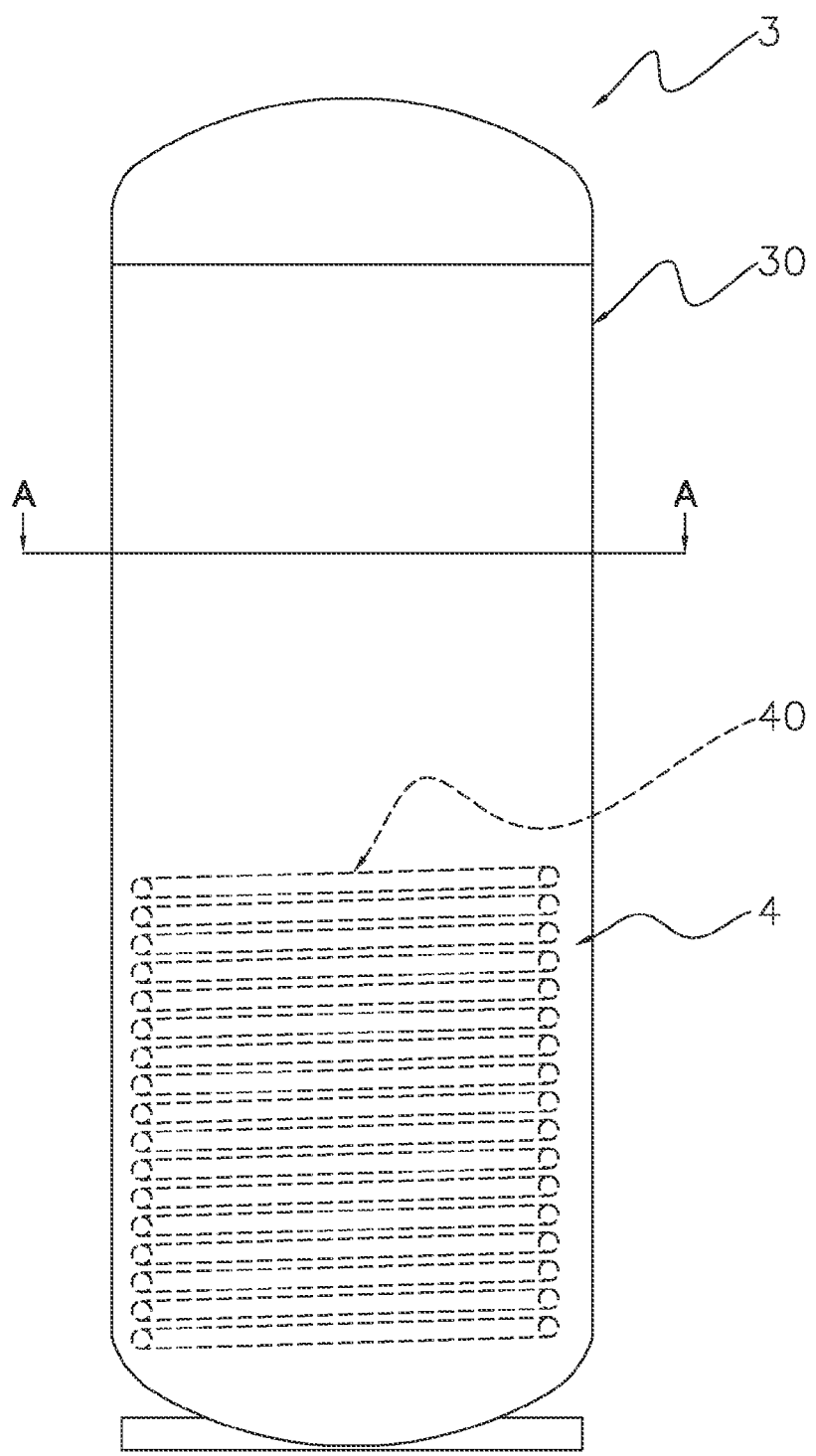
FIG. 1 is a front view of a water storage vessel assembly equipped with a coil support member pertaining to an embodiment of the present invention.

FIG. 1 is a front view of a water storage vessel assembly equipped with a coil support member pertaining to one embodiment of the present invention. In FIG. 1, a water storage vessel assembly 3 is used as a vessel that stores hot water of a hot water storage-type water heater and is equipped with a water storage vessel 30 and a coil 4 that is placed inside the water storage vessel 30. The water storage vessel 30 is a cylindrical vessel made of stainless steel, and its top portion and its bottom portion are formed in bowl-like shapes.

The coil 4 is one type of heat exchanger configured by a tube 40 that is coiled in the shape of a cylindrical helix; in the present embodiment, the tube 40 is a tube made of stainless steel whose corrosion resistance and heat resistance are high, and high-temperature hot water circulates inside the tube 40. The water inside the water storage vessel 30 can be heated to about 80° C. by heat exchange with the coil 4.

The tube 40 of the coil 4 is connected to a heat pump unit (not shown) installed outside the water storage vessel assembly 3, and the high-temperature hot water circulating through the coil 4 is heated by the heat pump unit. The heating principle resulting from the heat pump unit is a well-known technology and is also introduced in patent citation 1, so description will be omitted here.

Figure 2:
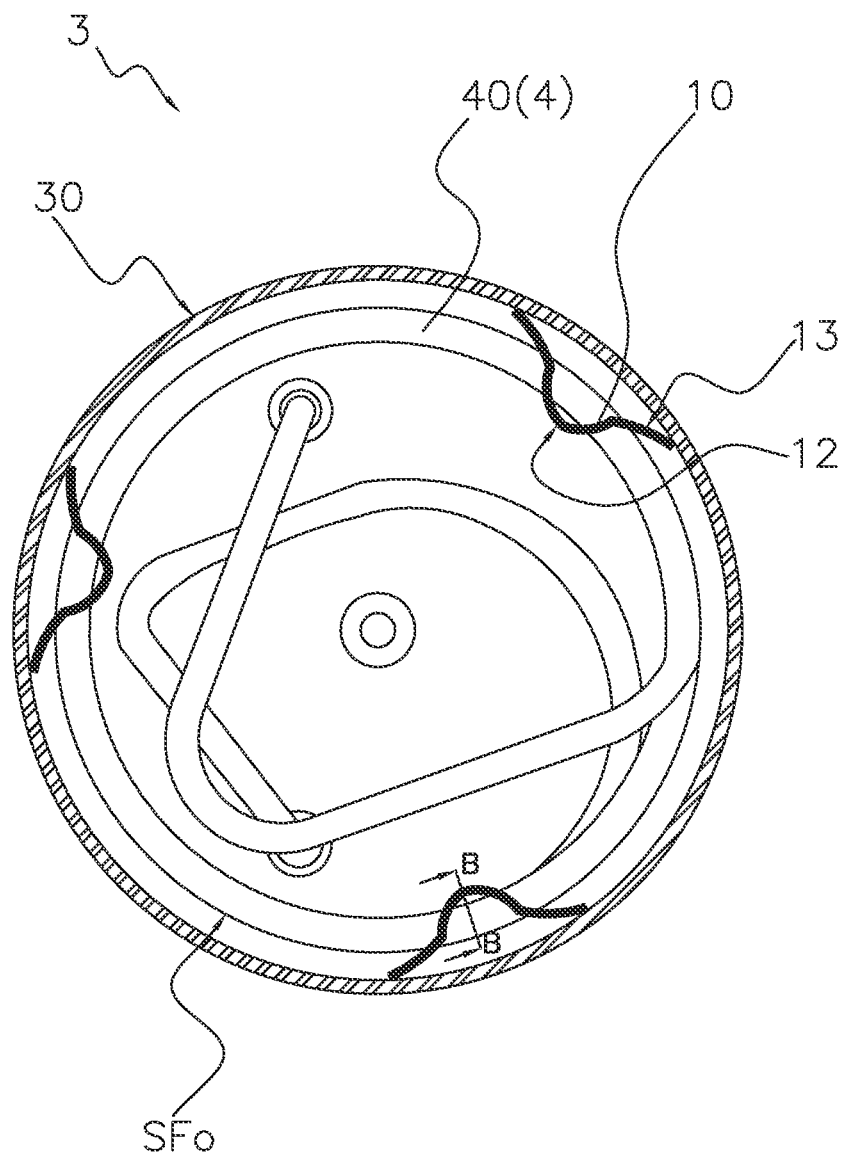
FIG. 2 is a sectional view of the water storage vessel assembly along line A-A of FIG. 1.

FIG. 2 is a sectional view of the water storage vessel assembly along line A-A of FIG. 1. In FIG. 2, coil support members 10 are attached to the coil 4 such that a clearance is ensured between the outer peripheral surface of the coil 4 and the inner peripheral surface of the water storage vessel 30. Three of the coil support members 10 are placed on the coil 4 at 120° intervals with respect to the center of the coil 4.

<Coil Support Member 10>

Figure 3:
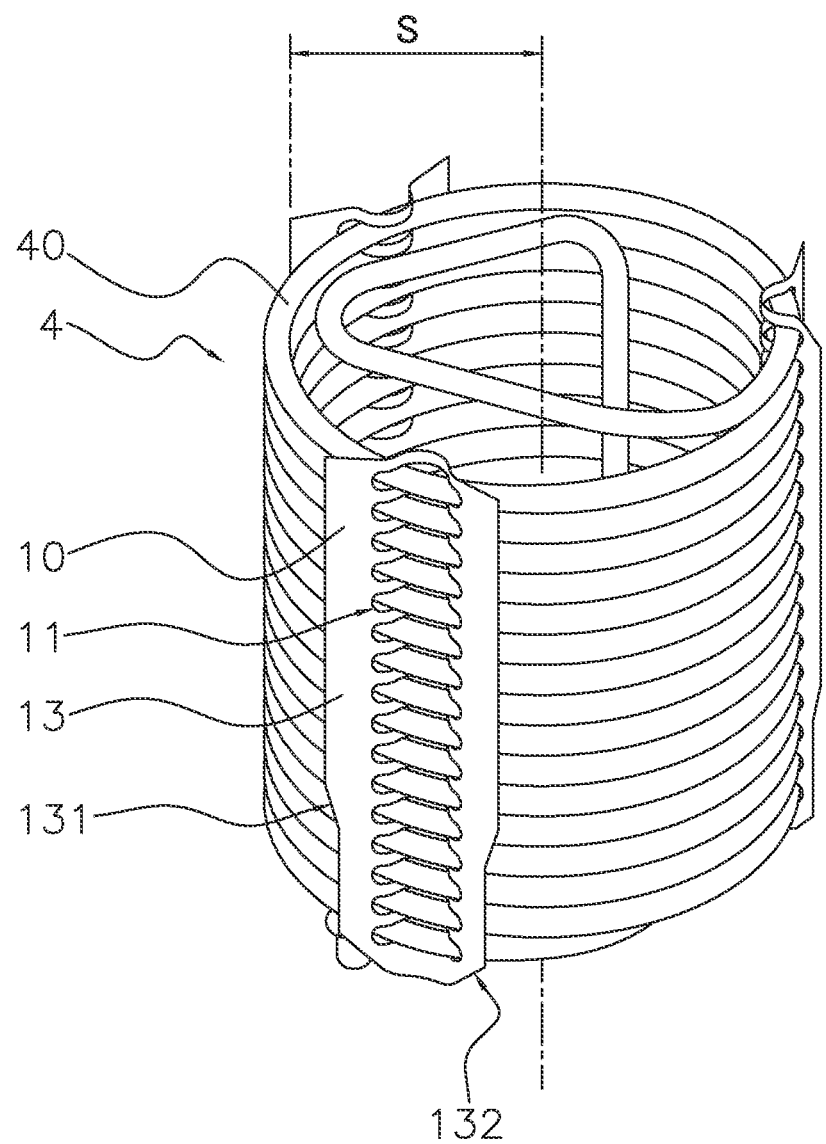
FIG. 3 is a perspective view of a coil to which coil support members are attached.

FIG. 3 is a perspective view of the coil to which the coil support members are attached. In FIG. 3, the coil support members 10 prevent contact between mutually adjacent loops of the tube 40 of the coil 4 and suppress contact between the inner peripheral surface of the water storage vessel 30 and the outer peripheral surface of the coil 4. The outer peripheral O surface of the coil 4 is, as shown in FIG. 2, a virtual surface configured by extending, in the lengthwise direction of the coil 4, the line of the outermost perimeter of the tube 40 when seen in a plan view. In the present embodiment, the outer peripheral surface of the coil 4 is a virtual cylindrical surface SFo having the helix outer diameter of the helical coil 4.

(Openings 11)

Figure 4:
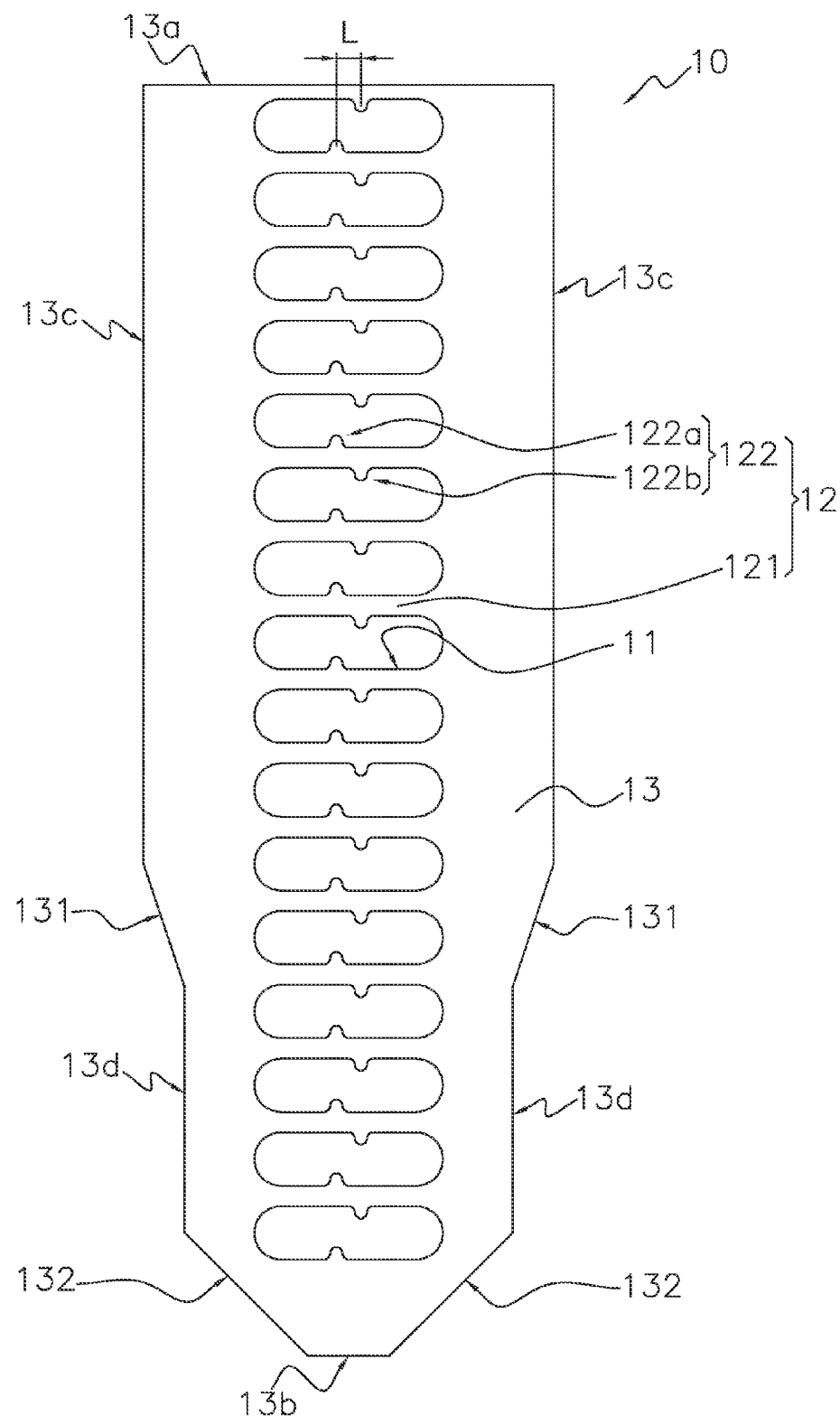
FIG. 4 is a front view of the coil support member.

FIG. 4 is a front view of the coil support member. In FIG. 3 and FIG. 4, not only is the function of simply preventing contact between the mutually adjacent loops of the tube 40 of the coil 4 required of the coil support member 10, but also the function of maintaining the clearances between the mutually adjacent loops of the tube 40 in a constant range; in order to realize these functions, multiple openings 11 formed an as to be arranged in a line an interval apart from each other in the lengthwise direction are disposed in the coil support member 10. The openings 11 are elongate holes, and their lengthwise direction is perpendicular to the lengthwise direction of the coil support member 10. The corners of the openings 11 are shaped in arc shapes.

(Insertion Portions 12)

As shown in FIG. 4, the coil support member 10 comprises insertion portions 12 and a non-insertion portion 13. The insertion portions 12 are formed between the openings 11 that are mutually adjacent, and the insertion portions 12 are inserted into an intra-coil space located further inward in the radial direction than the outer peripheral surface of the coil 4 when the coil support member 10 is attached to the coil 4.

Further, the insertion portions 2 have insertion body portions 121 and engagements portion 122. The insertion body portions 121 maintain the clearances between the mutually adjacent loops of the tube 40 at a substantial constant. The engagement portions 122 project from the insertion body portions 121, contact the tube 40 from the intra-coil space, and maintain the inserted state of the insertion body portions 121.

The engagement portions 122 include first engagement portions 122a and second engagement portions 122b. As shown in FIG. 4, in a state before the coil support member 10 is attached to the coil 4, the first engagement portions 122a project from one of the insertion body portions 121 towards the opening 11 on the upper side of the openings that are adjacent to both the upper and lower sides of that one insertion body portion, and the second engagement portions 122b project towards the opening 11 on the lower side. That is, the directions in which the first engagement portions 122a and the second engagement portions 122b project are substantially parallel to the lengthwise direction of the coil support member 10. The engagement portions 122 may also comprise just either one of the first engagement portions 122a and the second engagement portions 122b; however, in that case, it is necessary to note that it becomes easier for the sides of the insertion body portions 121 having either one of the first engagement portions 122a and the second engagement portions 122b to be pressed by the tube 40 and twist in one direction. Consequently, having one more engagement portion on the opposite side prevents twisting in one direction, so there is the effect that it becomes even more difficult for the coil support member 10 to become disengaged from the tube 40. In the description hereinafter, when reference is made to the engagement portions 122, this will be taken to describe matters common to the first engagement portions 122a and the second engagement portions 122b.

Further, the first engagement portions 122a and the second engagement portions 122b are positioned a certain distance (hereinafter called "pitch L") apart from each other along a direction orthogonal to the direction in which the openings 11 are arranged in a line, that is, along the lengthwise direction of the openings 11. In the present embodiment, the pitch L is set to 10 mm, but it is not limited to this. It is also possible for the pitch L to be equal to 0, that is, for the first engagement portions 122a and the second engagement portions 122b to be arranged on a single line. However, in that case, it is necessary to note that the two sets of engagement portions bend at the same time when the insertion body portions 121 are inserted into the clearances between the mutually adjacent loops of the tube 40, so the insertion force becomes larger, Consequently, positioning the first engagement portions 122a and the second engagement portions 122b the pitch L apart from each other makes it possible to insert the insertion portions such that one set of the engagement portions bends first and then the other set of the engagement portions bends tater, so the peak of the insertion force can be lowered, As a result, insertion becomes even easier.

When an assembly worker attaches the coil support member 10 to the coil 4, the worker places the insertion body portions 121 into the clearances between the mutually adjacent loops of the tube 40. At this time, the engagement portions 122 contact the tube 40, move through the clearances while bending, and eventually confront the tube 40 from the intra-coil space.

The distal end portions of the engagement portions 122 are shaped in arc shapes, so it becomes easier for the distal end portions of the engagement portions 122 and the surface of the tube 40 to slide against each other; as a result, it becomes easier for the insertion body portions 121 to enter the clearances between the mutually adjacent loops of the tube 40. Further, when the engagement portions 122 bend, stress concentrates in the joint portions between the engagement portions 122 and the insertion body portions 121, but because the joint portions are also shaped in arc shapes, the stress is suppressed from concentrating in one point. As a result, damage to the joint portions is prevented.

Figure 5:
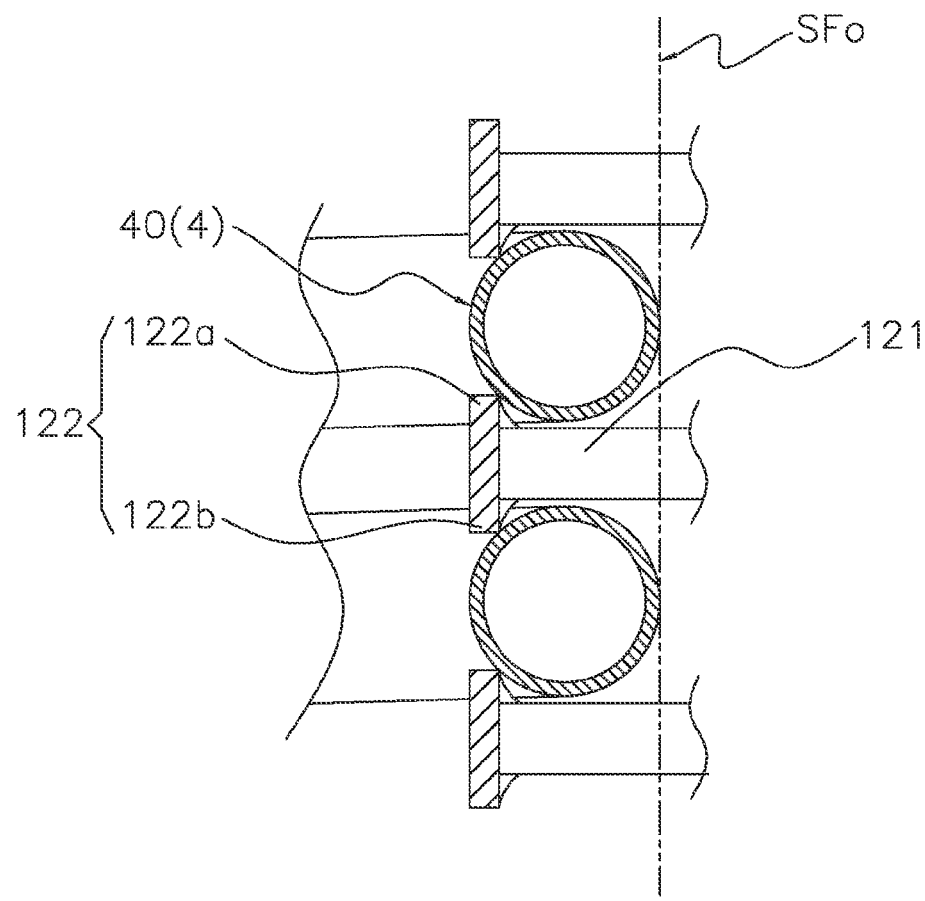
FIG. 5 is a partial sectional view of the coil and the coil support member along line B-B of FIG. 2.
Figure 6A:
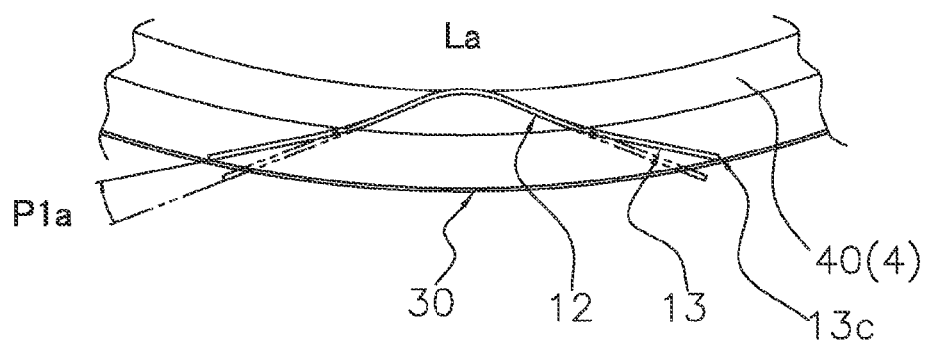
FIG. 6A is a partial transverse sectional view of the water storage vessel assembly showing displacement of width direction ends of a non-insertion portion when a pitch L=0.
Figure 6B:
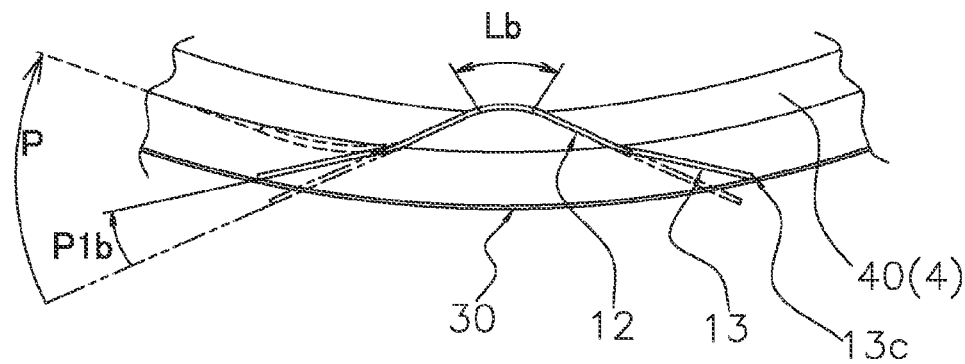
FIG. 6B is a partial transverse sectional view of the water storage vessel assembly showing displacement of the width direction ends of the non-insertion portion when the pitch L=10 mm.
Figure 6C:
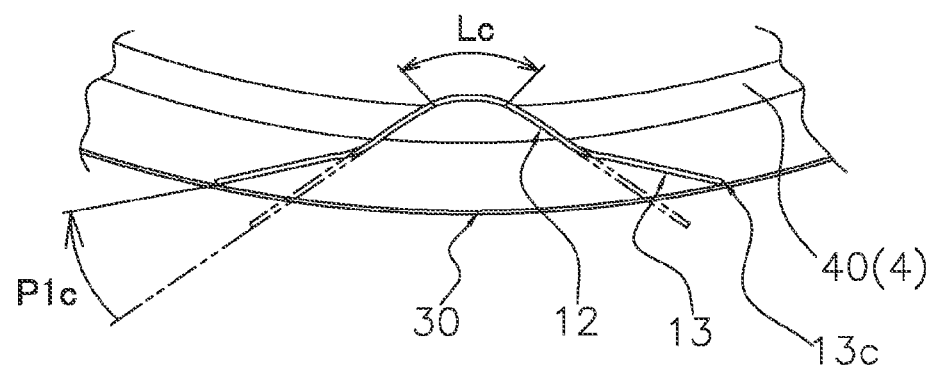
FIG. 6C is a partial transverse sectional view of the water storage vessel assembly showing displacement of the width direction ends of the non-insertion portion when the pitch L=24 mm.
Figure 6D:
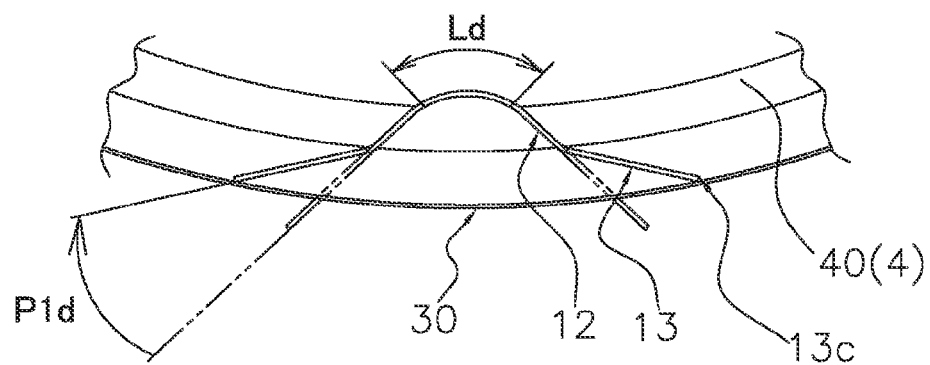
FIG. 6D is a partial transverse sectional view of the water storage vessel assembly showing displacement of the width direction ends of the non-insertion portion when the pitch L=30 mm.
Figure 6E:
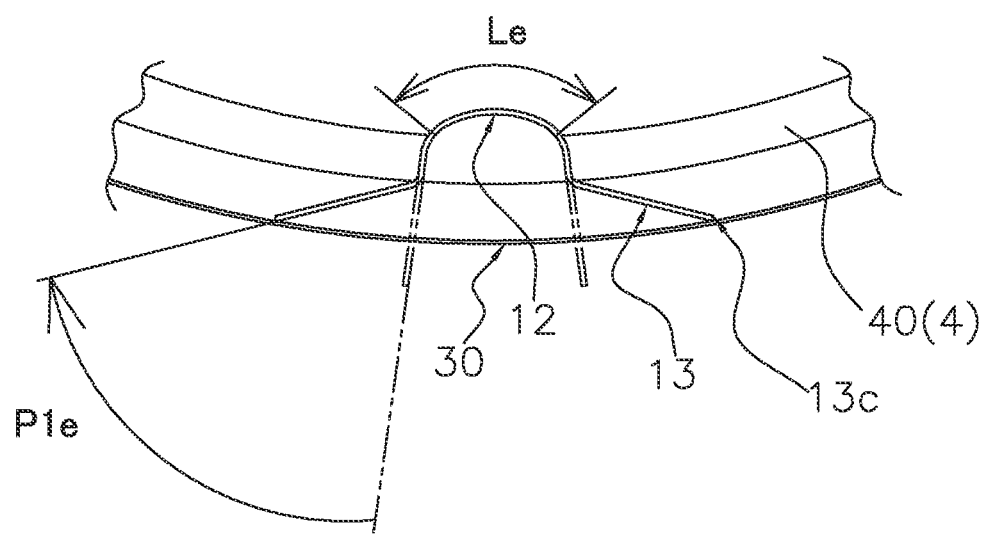
FIG. 6E is a partial transverse sectional view of the water storage vessel assembly showing displacement of the width direction ends of the non-insertion portion when the pitch L=42 mm.

FIG. 5 is a partial sectional view of the coil and the coil support member along line B-B of FIG. 2. In FIG. 5, the first engagement portions 122a project from one of the insertion body portions 121 towards the opening 11 on the upper side of the openings 11 that are adjacent to both the upper and lower sides of that one insertion body portion, and the direction in which the first engagement portions 122a project is parallel to the lengthwise direction of the coil 4. The second engagement portions 122b project towards the opening 11 on the lower side and, like the first engagement portions 122a, are parallel to the lengthwise direction of the coil 4.

As shown in FIG. 5, once the coil support member 10 is attached to the coil 4, even if the coil support member 10 tries to move in a direction away from the tube 40, the first engagement portions 122a and the second engagement portions 122b deter the movement of the coil support member 10, so the coil support member 10 cannot become disengaged from the tube 40.

(Non-Insertion Portion 13)

The non-insertion portion 13 is positioned in an extra-coil space located further outward in the radial direction than the outer peripheral surface of the coil 4 when the coil support member 10 is attached to the coil 4, and the non-insertion portion 13 suppresses contact between the inner peripheral surface of the water storage vessel 30 and the outer peripheral surface of the coil 4. As shown in FIG. 2, both ends (width direction free ends) of the non-insertion portion 11 are brought into contact with the inner peripheral surface of the water storage vessel 30, and when the assembly has been shaken by vibration or the like such that the outer peripheral surface of the coil 4 comes close to the inner peripheral surface of the water storage vessel 30, both ends of the non-insertion portion 13 bend and push back against the inner peripheral surface of the water storage vessel 30. Therefore, hitting of the kind where the inner peripheral surface of the water storage vessel 30 and the outer peripheral surface of the coil 4 collide with each other is prevented.

Further, the outline of the non-insertion portion 13 is, when seen in the front view of FIG. 4, formed by an upper side end 13a, right and left ends 13c, right and left first slanted portions 131, right and left ends 13d, right and left second slanted portions 132, and a lower side end 13b. The first slanted portions 131 slant in a direction in which the width of the non-insertion portion 13 becomes narrower nearer the lower side end 13b when seen in the front view of FIG. 4. For convenience of description, the lower side end when seen in the front view of FIG. 4 will be called "the first-in end 13b". The second slanted portions 132 slant in the direction in which the width of the non-insertion portion 13 becomes narrower from positions nearer the first-in end 13b than the first slanted portions 131—that is, from the endpoints of the right and left ends 13d—to the first-in end 13b.

In the work of assembling the water storage vessel assembly 3, when the worker inserts the coil 4 into the water storage vessel 30, the worker inserts the coil 4 into the water storage vessel 30 while forcibly bending, along the circumferential surface of the water storage vessel 30, the end portion of the coil support member 10 attached to the coil 4. At this time, if the width of the non-insertion portion 13 was the same dimension from the upper side end 13a to the first-in end 13b, there would be the potential for the first-in end 13b side to be shaved by the opening edge of the water storage vessel 30.

However, because the non-insertion portion 13 slants such that the width of the non-insertion portion 13 on the first-in end 13b side becomes narrower towards the first-in end 13b, the bending amount at the initial stage of incorporation is small and shaving is suppressed. Further, after the coil support member has been incorporated a certain extent, the portion that has not yet been incorporated also bends by itself after the bending of the portion that has been incorporated first, so incorporation becomes easier.

Further, "S" shown in FIG. 3 is a hypothetical shortest dimension interconnecting in a shortest manner the central axis of the coil 4 and the width direction ends (the right and left ends when seen in the front view of FIG. 4) 13c of the non-insertion portion 13 of the coil support member 10 as attached to that coil 4. Here, when P1 denotes a force needed for applying, to the width direction ends 13c of the non-insertion portion 13, bending equivalent to a dimensional difference S-R between an inner peripheral surface radius R of the water storage vessel 30 and the hypothetical shortest dimension S, in the coil support member 10 of the present embodiment, P1 is set such that P1<100 N. This is a condition that can facilitate the work of incorporating the coil 4 into the water storage vessel 30 while bending the coil support member 10 when the worker incorporates the coil 4 into the water storage vessel 30 and is confirmed by the following simulations.

(Pitch L and Force P1)

FIG. 6A to FIG. 6E are partial transverse sectional views of the water storage vessel assembly showing displacement of the width direction ends of the non-insertion portion for each of five types of pitches La to Le of different sizes. The pitch L is set to 0, 10 mm, 24 mm, 30 mm, and 42 mm in order from FIG. 6A to FIG. 6E. In FIG. 6A to FIG. 6E, the non-insertion portion 13 before the coil 4 is incorporated into the water storage vessel 30 is represented by two-dot chain lines and moves outward from the outer peripheral surface SFo of the coil 4 (see FIG. 2) more the larger the pitch L. Therefore, when the coil 4 is incorporated into the water storage vessel 30, the force P1 applied to the width direction ends 13c of the non-insertion portion 13 becomes larger in the order to P1a to P1e. Here, disclosure of specific numerical values will be refrained from, but it is confirmed that P1<100 N when the pitch L is equal to or less than 30 mm, and it is apparent that P1<100 N when the pitch Lb employed in the present embodiment is equal to 10 mm.

In the coil support member 10 after being incorporated into the water storage vessel 30, the free ends (the right and left ends 13c when seen in the front view of FIG. 4) of the non-insertion portion 13 are placed in astute where they are always pressed by the inner peripheral surface of the water storage vessel 30. In particular, because the bottom portion of the water storage vessel 30 is formed in a "bowl-like shape" where its diameter becomes smaller towards its center, ordinarily bending would become larger. However, as shown in FIG. 4, because the non-insertion portion 13 is tapered towards the first-in end 13b because of the second slanted portions 132, bending of the kind where stress concentrates on one side of the end portion is suppressed, and the coil support member can withstand prolonged use.

Further, in the present embodiment, all of the sites of the coil support member 10, such as the non-insertion portion 13, the insertion body portions 121, the first engagement portions 122a, and the second engagement portions 122b, are integrally molded out of high-density polyethylene resin, so the number of parts is reduced, and the coil support member 10 can be manufactured by any of the methods of milling, punch molding, and injection molding.

Particularly when the production quantity is small, manufacturing costs are suppressed more when the coil support member is manufactured by milling than when the coil support member is manufactured by punch molding or injection molding requiring a die and mold, so in the coil support member 10 of the present embodiment, the corners of the openings 11 are set in arc shapes beforehand such that they can adapt to a milling toot blade. Therefore, a reasonable manufacturing method can be selected depending on the production quantity.

Further, it is difficult for the coil support member to damage the tube 40 of the coil 4 because high-density polyethylene resin, which is the material, is lightweight and has a moderate degree of elasticity. Further, high-density polyethylene resin has no adverse effects on drinking water and food, is also resistant to high-temperature water for hot-water supply, and is suited to prolonged immersion in water.

(Coil Support Member 10 and Tube 40 Attachment Condition)

In the water storage vessel assembly 3, when the assembly has been shaken to the point where the outer peripheral surface of the coil 4 comes closest to the inner peripheral surface of the water storage vessel 30, there is the potential for the width direction ends (the right and left ends when seen in the front view of FIG. 4) of the non-insertion portion 13 to be pressed until they hit the outer peripheral surface of the coil 4. At this time, assuming that the force acting on the non-insertion portion 13 acts on all of the engagement portions 122 as a reaction force, the coil support member 10 does not become disengaged from the tube 40 if the force required to bend all of the engagement portions 12 is larger.

Thus, if an engagement portion pressing force D is a pressing force needed to bend one of the engagement portions 122 when the insertion portions 12 of the coil support member 10 are inserted into the coil 4 and a non-insertion pressing force P (e.g., see FIG. 6B) is a pressing force needed for holding until the width direction ends 13c of the non-insertion portion 13 of the coil support member 10 hit the outer peripheral surface of the coil 4, then the clearance between the inner peripheral surface of the water storage vessel 30 and the outer peripheral surface of the coil 4, the height dimension of the coil 4, the positions of the engagement portions 122, the material of the non-insertion portion 13, and the thickness dimension of the non-insertion portion 13 must be selected such that the relationship expression of P<N×D always holds true between a total number N of the engagement portions 122 of the coil support member 10, the engagement portion pressing force D, and the non-insertion portion pressing force P. Here, "selection" also includes the act of reselecting while confirming whether or not the relationship of P<N×D is satisfied after an arbitrary selection has been made.

<Characteristics of Present Embodiment>

(1)

In the coil support member 10, when the insertion body portions 121 enter the clearances between the mutually adjacent loops of the tube 40 of the coil 4, the first engagement portions 122a and the second engagement portions 122b contact the tube 40, move through the clearances while bending, and eventually confront the tube 40 from the intra-coil space. Even if the coil support member 10 tries to move in a direction away from the tube 40, the first engagement portions 122a and the second engagement portions 122b deter the movement of the coil support member 10, so the coil support member 10 is prevented from becoming disengaged from the tube 40.

(2)

In the coil support member 10, the distal end portions of the first engagement portions 122a and the second engagement portions 122b have arc shapes, so it becomes easier for the distal end portions of the first engagement portions 122a and the second engagement portions 122b and the surface of the tube 40 to slide against each other, and it becomes easier for the insertion body portions 121 to enter the clearances between the mutually adjacent loops of the tube 40. Further, when the first engagement portions 122a and the second engagement portions 122b bend, stress concentrates in the joint portions, but because the joint portions are shaped in arc shapes, the stress is suppressed from concentrating in one point and damage to the joint portions is prevented.

(3)

In the coil support member 10, twisting of the insertion body portions 121 in one direction is prevented as a result of the first engagement portions 122a and the second engagement portions 122b being located mutually opposite positions, so it becomes difficult for the coil support member 10 to become disengaged from the tube 40.

(4)

In the coil support member 10, the first engagement portions 122a and the second engagement portions 122b are positioned the pitch L=10 mm apart from each other, so it becomes possible to insert the insertion body portions 121 such that the first engagement portions 122a bend first and the second engagement portions 122b bend later, the peak of the insertion force can be lowered, and, correspondingly, insertion becomes easier.

(5)

In the coil support member 10, the non-insertion portion 13, the insertion body portions 121, the first engagement portions 122a, and the second engagement portions 122b are integrally molded out of high-density polyethylene resin, so not only is the number of parts reduced, but the coil support member 10 can be manufactured by any of the methods of milting, punch molding, and injection molding. Therefore, a reasonable manufacturing method can be selected depending on the production quantity. Further, it is difficult for the coil support member to damage the tube because high-density polyethylene resin is lightweight and has a moderate amount of elasticity; moreover, high-density polyethylene resin has no adverse effects with respect to drinking water and food, is also resistant to high-temperature water for hot-water supply, and is suited to prolonged immersion in water.

(6)

In the water storage vessel assembly 3, the slanted portions 131 that allow the non-insertion portion 13 to slant towards the first-in end 13b such that the width of the non-insertion portion 13 becomes narrower are formed on the coil support member 10, whereby, at the initial stage of incorporation, the bending amount becomes small and shaving is suppressed. The first-in end 13b of the non-insertion portion 13 is tapered because of the second slanted portions 132, so bending of the kind where stress concentrates on one side of the end portion is suppressed, and the coil support member can withstand prolonged use.

(7)

In the water storage vessel assembly 3, the force P1 needed to bend the non-insertion portion 13 is set to be less than 100 N, so the work of the worker incorporating the coil 4 into the water storage vessel while bending the coil support member 10 becomes easier.

(8)

In the water storage vessel assembly 3, the clearance between the inner peripheral surface of the water storage vessel 30 and the outer peripheral surface of the coil 4, the height dimension of the coil 4, the positions of the engagement portions 122, the material of the non-insertion portion 13, and the thickness dimension of the non-insertion portion 13 are selected on the condition that the relational expression of P<N×D always holds true between the total number N of the engagement portions 122 of the coil support member 10, the engagement portion pressing force D, and the non-insertion portion pressing force P. Therefore, even when the force acting on the non-insertion portion 13 acts on ail of the engagement portions 122 as a reaction force, the force required to bend all of the engagement portions 122 is larger, so the coil support member 10 is prevented from becoming disengaged from the tube.

<First Modification>

Figure 7:
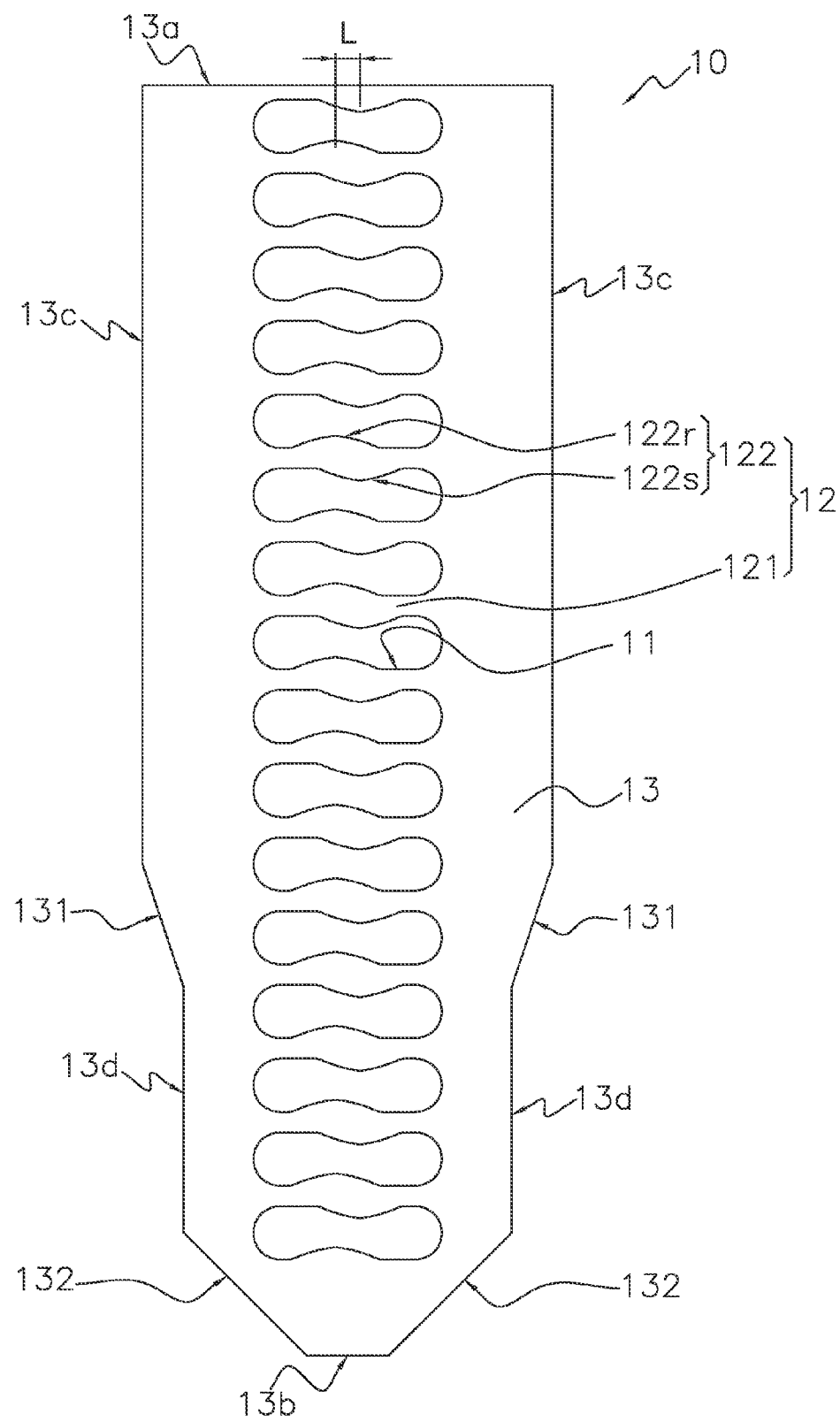
FIG. 7 is a front view of a coil support member pertaining to a first modification.

In the embodiment described above, the first engagement portions 122a and the second engagement portions 122b are shaped in arc shapes, but the shape of the engagement portions 122 is not limited to this. FIG. 7 is a front view of a coil support member pertaining to a first modification of the present embodiment. In FIG. 7, only the shape of the engagement portions of FIG. 4 is changed, so reference signs that are identical to the reference signs used in FIG. 4 will be used for portions other than the first engagement portions and the second engagement portions, and description will be omitted.

In FIG. 7, the engagement portions 122 include first engagement portions 122r and second engagement portions 122s. The first engagement portions 122r project from one of the insertion body portions 121 towards the opening 11 on the upper side of the openings 11 that are adjacent to both the upper and lower sides of that one insertion body portion 121, and the second engagement portions 122s project towards the opening 11 on the tower side. Both the first engagement portions 122r and the second engagement portions 122s have so-called O mountain shapes where the widths of the joints to the insertion body portions 121 are longer than the heights to the distal ends. For this reason, the opening areas of the openings 11 are smaller as compared to the openings in the embodiment described above, but in both the first engagement portions 122r and the second engagement portions 122s, the slanted surfaces interconnecting the tops and the joints to the insertion body portions 121 become gentle, and. it becomes easier for the insertion body portions 121 to enter the clearances between the mutually adjacent loops of the tube 40.

<Second Modification>

Figure 8:
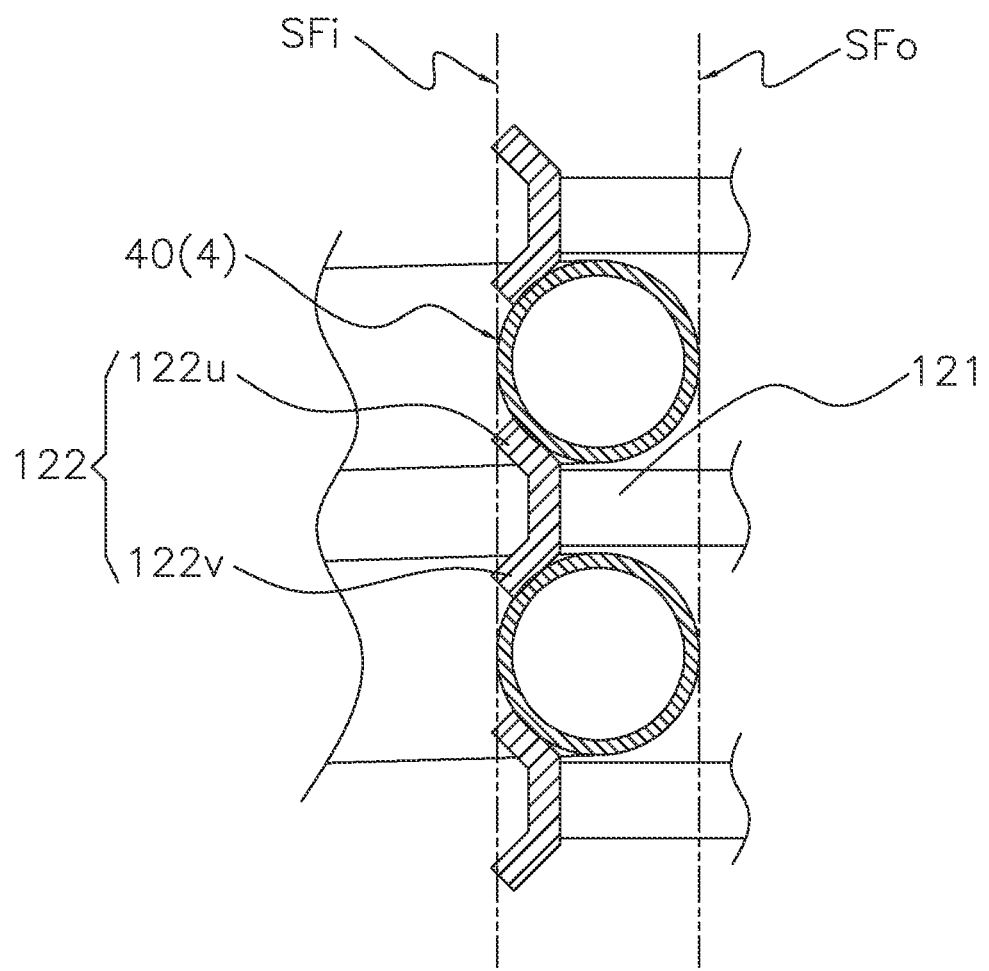
FIG. 8 is a partial sectional view of a coil and a coil support member pertaining to a second modification.

In the embodiment described above, the direction in which the first engagement portions 122a and the second engagement portions 122b project is parallel to the lengthwise direction of the coil 4, but it is not limited to this. FIG. 8 is a partial sectional view of a coil and a coil support member pertaining to a second modification. In FIG. 8, first engagement portions 122u project diagonally upward from between mutually adjacent loops of the tube 40 towards the vicinity of an inner peripheral surface SFi of the coil 4. Further, second engagement portions 122v project diagonally downward from between mutually adjacent loops of the tube 40 towards the vicinity of the inner peripheral surface SFi of the coil 4. Even in this case, once the coil support member 10 is attached to the coil 4, even if the coil support member 10 tries to move in a direction away from the tube 40, the first engagement portions 122u and the second engagement portions 122v deter the movement of the coil support member 10, so the coil support member 10 cannot become disengaged from the tube 40.

<Third Modification>

Figure 9:
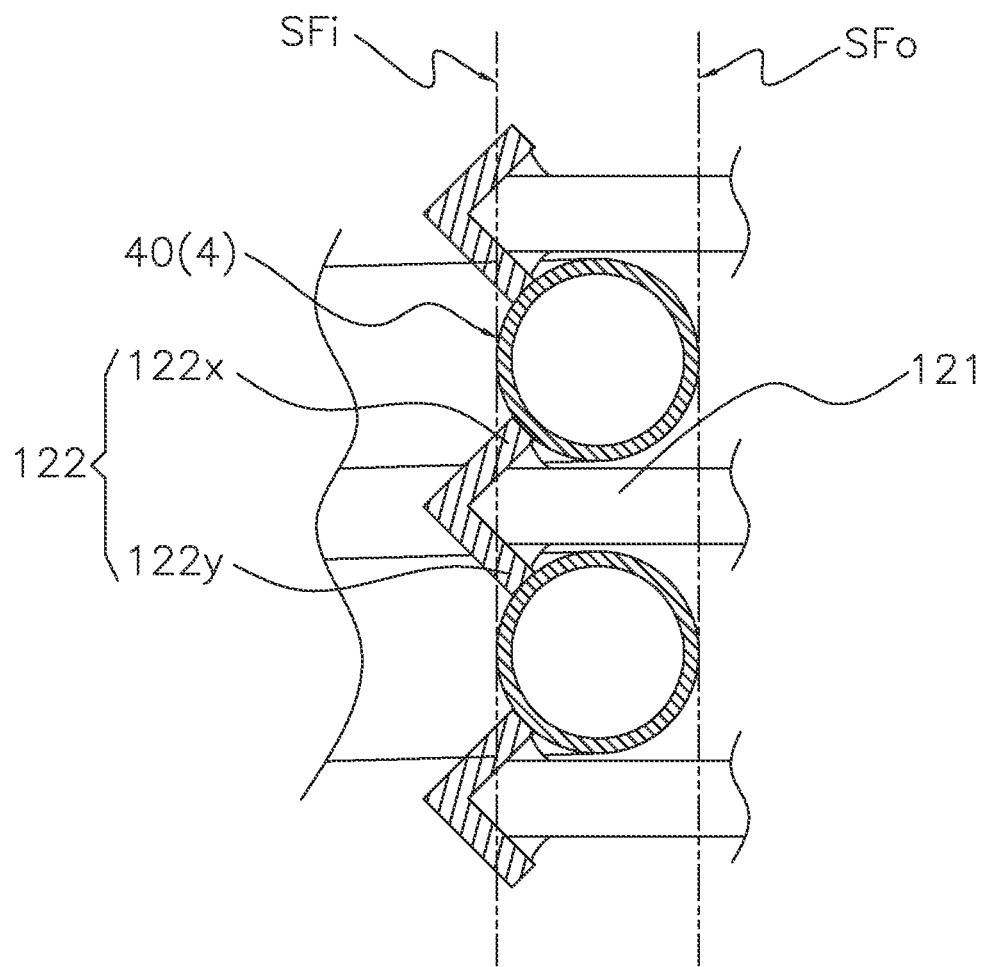
FIG. 9 is a partial sectional view of a coil and a coil support member pertaining to a third modification.

Moreover, FIG. 9 is a partial sectional view of a coil and a coil support member pertaining to a third modification. In FIG. 9, first engagement portions 122x project diagonally upward towards the inner peripheral surface SFi from further inward of the inner peripheral surface SFi of the coil 4. Further, second engagement portions 122y project diagonally downward towards the inner peripheral surface SFi from further inward of the inner peripheral surface SFi of the coil 4. Even in this case, once the coil support member 10 is attached to the coil 4, even if the coil support member 10 tries to move in a direction away from the tube 40, the first engagement portions 122x and the second engagement portions 122y deter the movement of the coil support member 10, so the coil support member 10 cannot become disengaged from the tube 40.

INDUSTRIAL APPLICABILITY

As described above, according to the present invention, the clearances between the mutually adjacent loops of the tube 40 of the coil 4 are stabilized and contact between the outer peripheral surface of the coil 4 and the inner peripheral surface of the water storage vessel 30 is also suppressed by the coil support member 10, so the invention is useful not just in water heaters but in devices where a coil heat exchanger with a coiled tube is placed inside a vessel.

What is claimed is:

1. A water storage vessel assembly comprising:
   a water storage vessel;
   a coil having a coiled tube placed inside the water storage vessel; and
   a coil support member configured to be attached to the coil, the coil support member comprising:
   multiple openings arranged in a line in a lengthwise direction, the multiple openings and sites surrounding the openings being configured to prevent contact between mutually adjacent loops of the tube of the coil and to suppress contact between an inner peripheral surface of the water storage vessel and an outer peripheral surface of the coil;
   insertion portions formed between the openings and being mutually adjacent, with the insertion portions being inserted into an intra-coil space located further inward in a radial direction of the coil than the outer peripheral surface of the coil when the coil support member is attached to the coil; and
   a non-insertion portion positioned in an extra-coil space located further outward in the radial direction of the coil than the outer peripheral surface of the coil when the coil support member is attached to the coil,
   the insertion portions having
      insertion body portions preventing contact between mutually adjacent loops of the tube, the insertion body portions having curved shapes projecting along an insertion direction of the insertion portions with respect to the coil, the insertion direction of the insertion portions extending along the radial direction of the coil, and
      engagement portions projecting from the insertion body portions, the engagement portions contacting the tube from the intra-coil space and maintaining an inserted state of the insertion body portions, distal end portions of the engagement portions having arc shapes, and joint portions connecting base end portions of the engagement portions and the insertion body portions having arc shapes,
   each of the engagement portions including
      a first engagement portion projecting from one of the insertion body portions towards one side of the opening between two adjacent insertion body portions, and
      a second engagement portion projecting from the other insertion body portion towards an opposite side of the opening,
   each of the first engagement portions and the second engagement portions having a center line extending along the direction in which the openings are arranged in a line, the center lines of the first engagement portions and the second engagement portions being offset a predetermined distance apart from each other in a direction orthogonal to the direction in which the openings are arranged in a line, and the coiled tube being sandwiched by the engagement portions and opposed ends of the openings.

2. The water storage vessel assembly according to claim 1, wherein the non-insertion portion, the insertion body portions, and the engagement portions are integrally molded.

3. The water storage vessel assembly according to claim 2, wherein, the coil support member is molded out of high-density polyethylene.

4. The water storage vessel assembly according to claim 1, wherein the non-insertion portion of the coil support member includes first slanted portions slanting in a direction where the width of the non-insertion portion becomes narrower nearer a lengthwise direction end surface, and second slanted portions slanting in the direction where the width of the non-insertion portion becomes narrower from positions nearer the end surface than the first slanted portions to the end surface formed therein.

5. The water storage vessel assembly according to claim 1, wherein a force needed to apply, to width direction free ends of the non-insertion portion, a bending equivalent to a dimensional difference S-R between an inner peripheral surface radius R of the water storage vessel and a hypothetical shortest dimension S interconnecting in a shortest manner the central axis of the coil and the free ends of the non-insertion portion of the coil support member as attached to the coil is less than 100 N.

6. The water storage vessel assembly according to claim 1, wherein a clearance between the inner peripheral surface of the water storage vessel and the outer peripheral surface of the coil, a height dimension of the coil, positions of the engagement portions, the material of the non-insertion portion, and a thickness dimension of the non-insertion portion are selected s the relational expression of P<N×D is always true, where N is a total number of the engagement portions of the coil support member, D is an engagement portion pressing force needed to bend one of the engagement portions when the insertion portions of the coil support member are inserted into the coil, and P is a non-insertion portion pressing force needed to hold until width direction free ends of the non-insertion portion of the coil support member hit the outer peripheral surface of the coil.

7. The water storage vessel assembly according to claim 1, wherein the insertion portions are configured such that the shapes of the insertion body portions do not change before and after the coil support member is attached to the coil.

* * * * *